US007006573B2

(12) United States Patent
Kobayashi

(10) Patent No.: US 7,006,573 B2
(45) Date of Patent: Feb. 28, 2006

(54) IMAGE PROCESSING APPARATUS AND METHOD, AND COMPUTER READABLE STORAGE MEDIUM

(75) Inventor: Yutaka Kobayashi, Tokyo (JP)

(73) Assignee: NEC Electronics Corporation, Kanagawa (JP)

( * ) Notice: Subject to any disclaimer, the term of this patent is extended or adjusted under 35 U.S.C. 154(b) by 1231 days.

(21) Appl. No.: 09/814,691

(22) Filed: Mar. 15, 2001

(65) Prior Publication Data

US 2001/0022629 A1 Sep. 20, 2001

(30) Foreign Application Priority Data

Mar. 16, 2000 (JP) ........................... P2000-074859

(51) Int. Cl.
*H04B 1/66* (2006.01)

(52) U.S. Cl. ................................................. 375/240.24

(58) Field of Classification Search ........... 375/240.11, 375/240.15, 240.24; 710/7; H04N 1/66
See application file for complete search history.

(56) References Cited

U.S. PATENT DOCUMENTS 6,738,425 B1 * 5/2004 Tagawa et al. ........ 375/240.12

FOREIGN PATENT DOCUMENTS

| | | |
|---|---|---|
| JP | 2-103689 | 4/1990 |
| JP | 2-203689 | 8/1990 |
| JP | 8-223567 | 8/1996 |
| JP | 11-98498 | 4/1999 |
| JP | 2000-13639 | 1/2000 |

* cited by examiner

*Primary Examiner*—Tung Vo
(74) *Attorney, Agent, or Firm*—Foley & Lardner LLP

(57) ABSTRACT

An image processing apparatus in which a time base corrector and an image coding apparatus are integrated so as to use a common memory, thereby realizing a simple circuit arrangement. The apparatus performs control of writing each line of input image data to an image memory in turn while reading image data from the image memory in predetermined coding units, in the following manner: when a picture of the image data has been written, if the number of data units, each corresponding to the coding unit, is equal to or below a first threshold, then a picture is skipped in the image data writing operation; and when a picture of the image data has been read, if the number of written lines is equal to or below a second threshold, then the same picture is again read in the image data reading operation.

18 Claims, 6 Drawing Sheets

IMAGE PROCESSING APPARATUS AND METHOD, AND COMPUTER READABLE STORAGE MEDIUM

BACKGROUND OF THE INVENTION

1. Field of the Invention

The present invention relates to an image processing apparatus and method for correcting a variation of an image signal and performing the coding of the image signal, and a computer readable storage medium storing a program for implementing the method.

2. Description of the Related Art

In a conventional method for coding image data using a stable synchronizing signal, an input image signal is input into a time base corrector so as to correct variations in the signal, and then image data in which such a variation has been corrected is coded in an image coding apparatus. The above variations include (i) dispersion of the transmission speed of the input image signal, (ii) disturbances of the synchronizing signal due to switching of scenes in the input image signal.

FIG. 4 is a block diagram showing the structure of a conventional time base corrector and image coding apparatus.

In FIG. 4, an analog image signal B1 such as an image signal obtained using a video camera, a recorded signal (to be reproduced) of a VTR, or a TV broadcast signal is input into a video decoder A1, where the analog signal is A/D converted and a digital image signal (called "image data" hereinbelow) B2 is obtained. In addition, an image-input clock and synchronizing signal B3 in synchronism with the image data B2 is also output from the video decoder A1. Therefore, these image data B2 and image-input clock and synchronizing signal B3 include a variation of the analog image signal B1.

Next, these image data B2 and image-input clock and synchronizing signal B3, including such a variation, are input into a time base corrector A8. In the time base corrector A8, the image writing section A10 writes image data B2 via image memory interface A11 into image memory A9 as image data B7. In this process, an image reading and writing control section A12 controls the data writing operation based on the clock signal (including a variation) output from the image writing section A10.

The image memory A9 has, for example, a storage capacity of 2 frames, and when a frame of image data B7 is written, the image reading section A13 performs the data reading operation and the next frame of image data is written. As the writing operation is accompanied by the reading operation, image data B8 is obtained. This image data B8 is read via image memory interface A11 by an image reading section A13. In this process, the image reading and writing control section A12 controls the data reading operation based on a stabilized clock signal output from a clock generator A19. Therefore, stable image data B9 in which variations of the input image signal are corrected, and a stable image-input clock and synchronous signal B10 are output from the time base corrector A8. The output signals are then input into an image coding apparatus A14.

In the image coding apparatus A14, an image writing section A16 writes the above image data B9 via an image memory interface A17 into an image memory A15 as image data B12. This writing operation is performed using the above clock signal B11. A coding section A18 then reads image data B13 via image memory interface A17 from the image memory A15 by using the clock signal B11, and codes the read data. Here, the reading operation from image memory A15 is executed for each coding unit, for example, for each Macro Block including 16×16 pixels, and the coding section A18 executes the coding operation in Macro-Block units. Accordingly, coded and compressed image data B6 can be obtained.

FIG. 5 is a block diagram showing the detailed structure of an example of the image writing and reading control section A12 in the time base corrector A8. In the figure, the image writing and reading control section A12 includes a writing line number threshold register A121, a reading line number threshold register A122, and a comparator A123.

FIG. 6A is a flowchart of the operation of writing data into image memory A9, while FIG. 6B is a flowchart of the operation of reading data from image memory A9. Both operations are performed by the image writing and reading control section A12.

For writing and reading control of the image memory A9, it is necessary to (i) prevent the writing operation from going ahead of the reading operation and thus deleting necessary data, and (ii) prevent the reading operation from going ahead of the writing operation and thus again reading out a previous frame during the reading of the current frame.

With reference to FIGS. 5 and 6A, it is assumed that the writing of a frame of image data is executed, as shown in step S11. Simultaneously, the reading of image data is performed (see step S21). When the writing of the frame is completed (see step S12), the comparator A123 compares the reading line number L1 received from the image reading section A13 with the threshold L2 received from the reading line number threshold register A122 (see step S13). The reading line number L1 indicates the number of lines in the current frame which have already been read. If L1>L2, the operation is returned to step S11 and the writing operation is continued, while if L1≦L2, it is determined that the writing operation may go ahead of the reading operation, and in step S14, a frame is skipped in the writing operation.

Next, with reference to FIGS. 5 and 6B, it is assumed that the reading of a frame of image data is executed, as shown in step S21. Simultaneously, the writing of image data is performed (see step S11). When the reading of the frame is completed (see step S22), the comparator A123 compares the writing line number L3 received from the image writing section A10 with the threshold L4 received from the writing line number threshold register A121 (see step S23). The writing line number L4 indicates the number of lines in the current frame which have already been written. If L3>L4, the operation is returned to step S21 and the reading operation is continued, while if L3≦L4, it is determined that the reading operation may go ahead of the writing operation, and in step S24, the current frame is again read in the reading operation.

Japanese Unexamined Patent Application, First Publication, No. Hei 8-223567, discloses an example of the above-explained conventional technique. In the coding apparatus disclosed in this document, a frame synchronizer is connected to a high-efficiency coding section, and each of the frame synchronizer and the high-efficiency coding has an image memory.

As explained above, in the conventional technique, a variation of image data is corrected using a time base corrector, and then the data is coded in an image coding apparatus. Therefore, a set of an image memory, an image writing section, and an image memory interface is necessary for each of the time base corrector and the image coding apparatus. Accordingly, the memory must have a large capacity, and the circuit arrangement must be complicated.

In addition, to provide two image memories causes an increase of the execution number of the data writing and reading operation, thereby increasing the processing time from the image input to the start of the coding.

SUMMARY OF THE INVENTION

In consideration of the above circumstances, an objective of the present invention is to provide an image processing apparatus in which a time base corrector and an image coding apparatus are integrated and the capacity of the memory is reduced, thereby realizing a simple circuit arrangement.

Therefore, the present invention provides an image processing apparatus comprising:

an image memory for storing image data; and a control section for performing control of writing each line of input image data to the image memory in turn while reading image data from the image memory in predetermined coding units, in a manner such that:

when a picture of the image data has been written, if the number of data units, each corresponding to the coding unit, is equal to or below a first threshold, then a picture is skipped in the image data writing operation; and when a picture of the image data has been read, if the number of written lines is equal to or below a second threshold, then the same picture is again read in the image data reading operation.

According to the above control in the writing and reading of image data into and from the image memory (provided between an image writing section and a coding section), an image coding apparatus and a time base corrector can be integrated, so that the coding operation can be performed using a single memory included in the integrated image coding apparatus. More specifically, deletion or insufficiency of necessary data in a memory in the coding operation can be prevented (such deletion or insufficiency may occur in a conventional image coding apparatus without a time base corrector). In addition, in comparison with the conventional structure in which the image coding apparatus and the time base corrector respectively use different memories, a single memory can be used in common, thereby reducing the memory capacity.

Furthermore, a simple circuit structure can be realized, and the processing time can be reduced.

Preferably, the image data writing operation is performed using a clock signal in synchronism with the input image data; and the image data reading operation is performed using a stabilized clock signal different from the clock signal used in the image data writing operation.

The image processing apparatus may further comprise a coding section for coding the read image data in the predetermined coding units.

The predetermined coding unit may be a Macro Block defined in MPEG.

Typically, a picture corresponds to a frame or a field of image data.

The present invention also provides an image processing method comprising the step of:

performing control of writing each line of input image data to an image memory in turn while reading image data from the image memory in predetermined coding units, in a manner such that:

when a picture of the image data has been written, if the number of data units, each corresponding to the coding unit, is equal to or below a first threshold, then a picture is skipped in the image data writing operation; and when a picture of the image data has been read, if the number of written lines is equal to or below a second threshold, then the same picture is again read in the image data reading operation.

The present invention also provides a computer readable storage medium storing a program for making a computer execute an operation including the step of:

performing control of writing each line of input image data to an image memory in turn while reading image data from the image memory in predetermined coding units, in a manner such that:

when a picture of the image data has been written, if the number of data units, each corresponding to the coding unit, is equal to or below a first threshold, then a picture is skipped in the image data writing operation; and when a picture of the image data has been read, if the number of written lines is equal to or below a second threshold, then the same picture is again read in the image data reading operation.

DESCRIPTION OF THE PREFERRED EMBODIMENTS

Hereinafter, an embodiment according to the present invention will be explained in detail with reference to the drawings.

Figure 1:
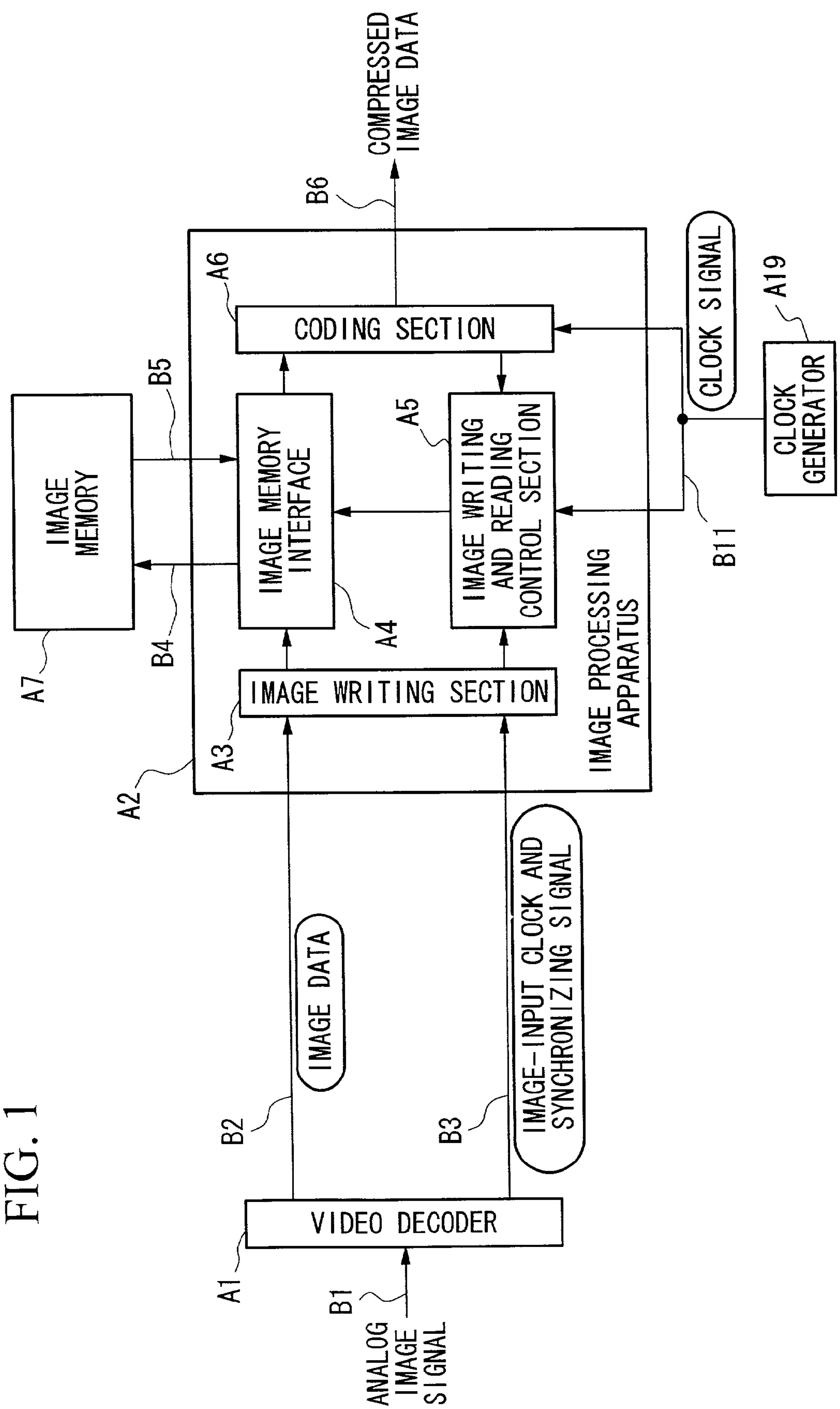
FIG. 1 is a block diagram showing the structure of the image processing apparatus as an embodiment according to the present invention.

FIG. 1 is a block diagram showing the structure of the embodiment of the present invention, that is, of an image processing apparatus A2 in which a time base corrector and an image coding apparatus are integrated, and which functions as an image coding apparatus having the function of a time base corrector.

In FIG. 1, an analog image signal B1 such as an image signal obtained using a video camera, a reproduced signal of a VTR, or a TV broadcast signal is input into a video decoder A1, where the analog signal is A/D converted and image data B2 is obtained. In addition, an image-input clock and synchronizing signal B3 in synchronism with the image data B2 is also output from the video decoder A1. As explained above, these image data B2 and image-input clock and synchronizing signal B3 include a variation of the analog image signal B1.

Next, these image data B2 and image-input clock and synchronizing signal B3 are input into an image processing apparatus A2. An image writing section A3 writes image data B2 via image memory interface A4 into image memory A7 as image data B4. In this process, the image writing section A3 and an image reading and writing control section A5 control the data writing operation based on a clock signal in synchronism with the image-input clock and synchronizing signal B3.

When a frame of image data B4 is first written into the image memory A7, the data reading operation is performed by the image reading and writing control section A5, and then the data reading is continued while the data writing operation is also performed. The read image data B5 is input via the image memory interface A4 into a coding section A6. In this case, the data in image memory A7 is read in coding units (i.e., each data unit corresponding to the coding unit is read in turn). For example, in the case of MPEG, data corresponding to each Macro Block including 16×16 pixels is read, and the coding section A6 codes data in Macro Block units according to a specific coding method such as MPEG2. Accordingly, coded and compressed image data B6 can be obtained.

In addition, the image reading and writing control section A5 performs reading control and coding operation by using a stabilized clock signal B11 supplied by a clock generator A11 which generates reference clock data.

Figure 2:
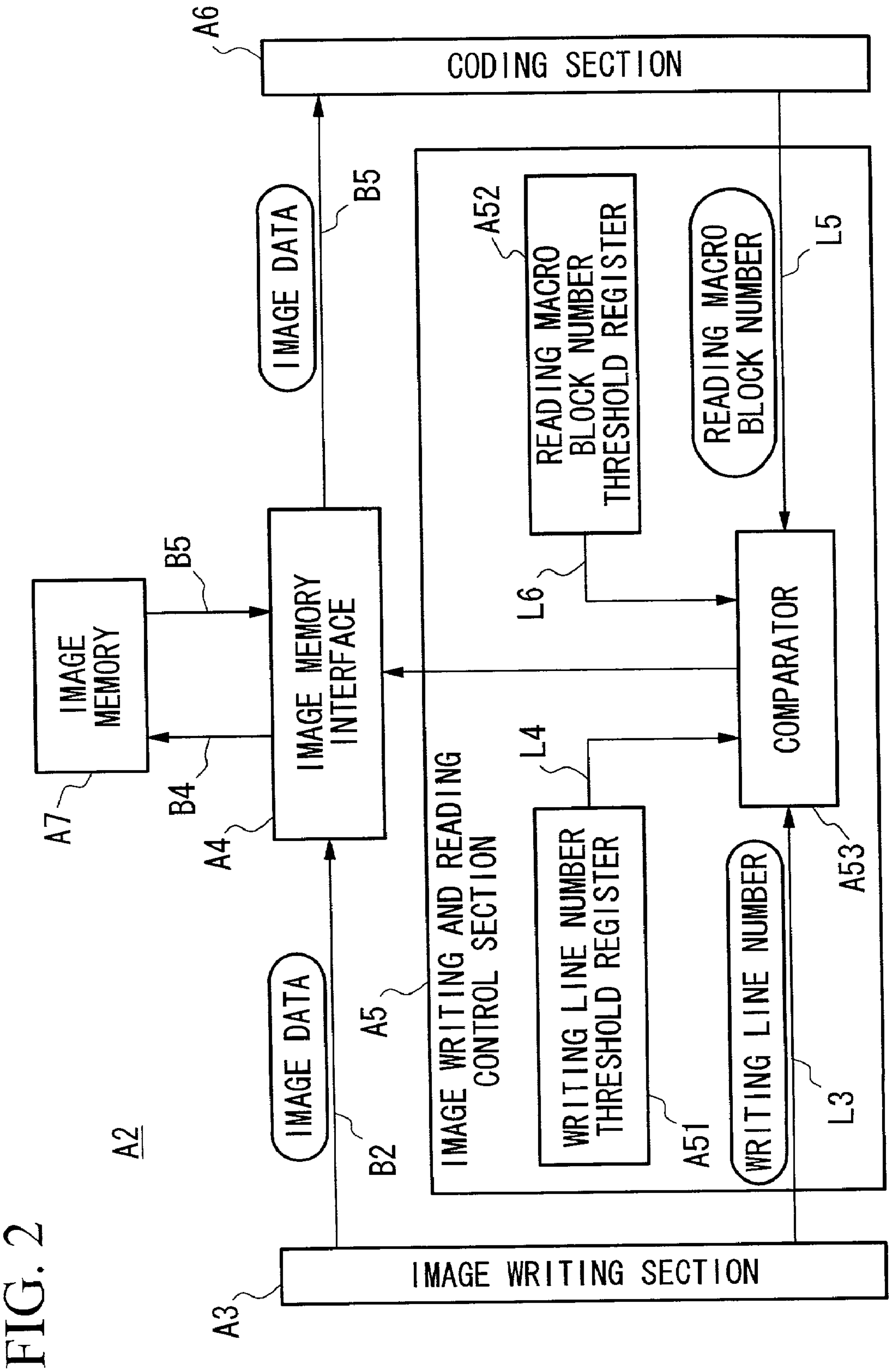
FIG. 2 is a block diagram showing the detailed structure of the image writing and reading control section in the image processing apparatus of FIG. 1.

FIG. 2 is a block diagram showing the detailed structure of the image writing and reading control section A5 in the image processing apparatus A2. In the figure, the image writing and reading control section A5 includes a writing line number threshold register A51, a reading Macro Block number threshold register A52, and a comparator A53.

Figure 3A:
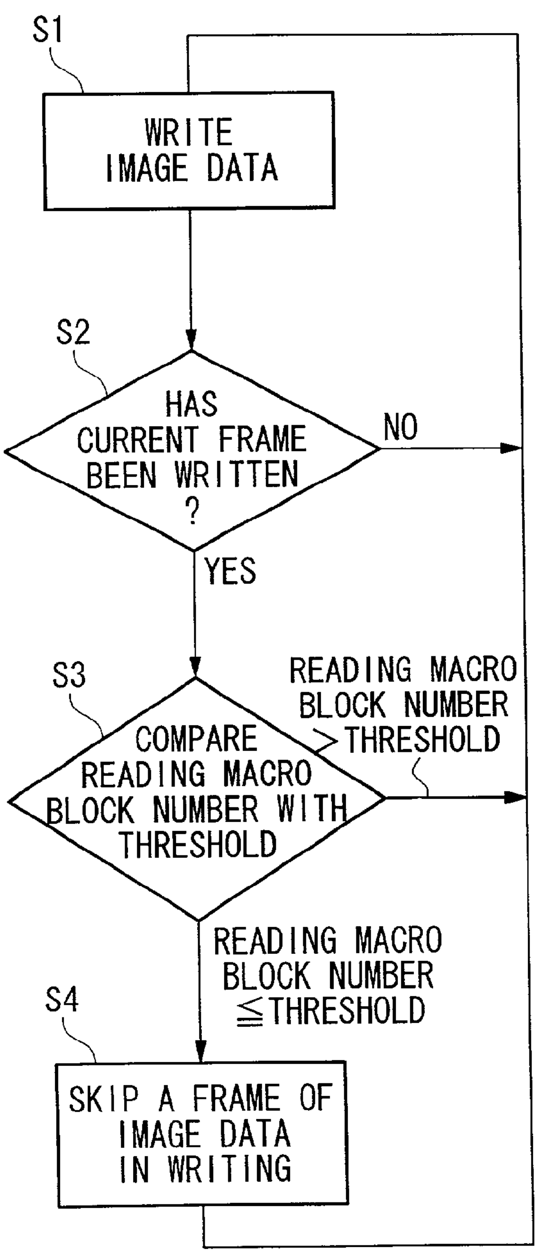
FIG. 3A is a flowchart of the operation of writing data into the image memory in the image processing apparatus.
Figure 3B:
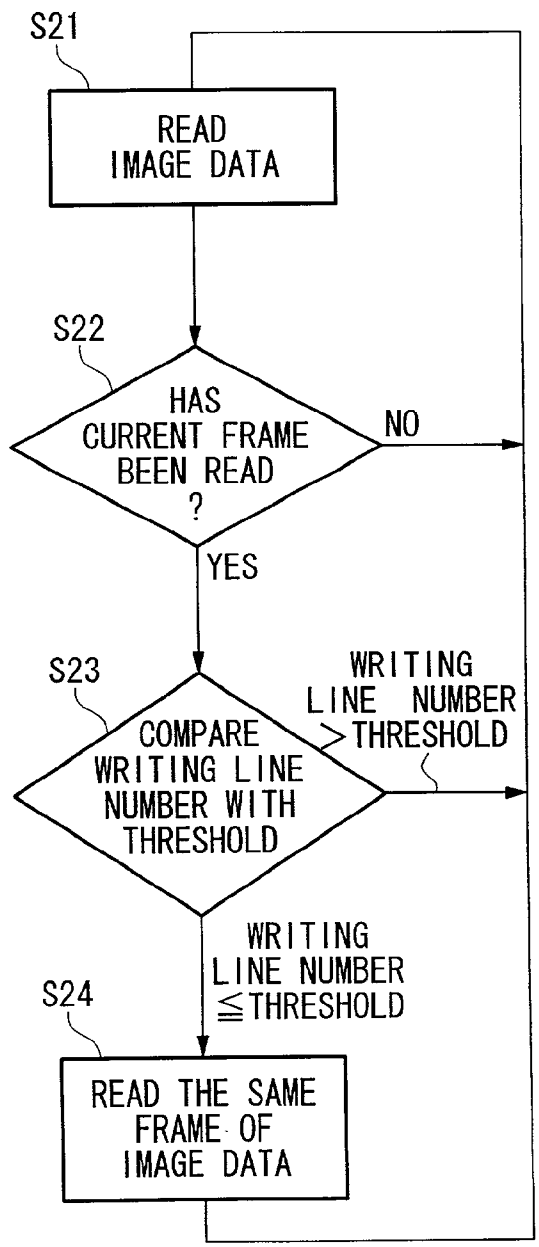
FIG. 3B is a flowchart of the operation of reading data from the image memory.

FIG. 3A is a flowchart of the operation of writing data into image memory A7, while FIG. 3B is a flowchart of the operation of reading data from image memory A7. Both operations are performed by the image writing and reading control section A5, and are provided for keeping a balance of the writing and reading operations.

With reference to FIGS. 2 and 3A, it is assumed that the writing of a frame of image data is executed, as shown in step S1. Simultaneously, the reading of image data is performed (see step S21). When the writing of the frame is completed (see step S2), the comparator A53 compares a reading Macro Block number L5 received from the coding section A6 with threshold L6 received from the reading Macro Block number threshold register A52 (see step S3). The reading Macro Block number L5 indicates the number of Macro Blocks in the current frame which have already been read. If L5>L6, the operation is returned to step S1 and the writing operation is continued, while if L5≦L6, it is determined that the writing operation may go ahead of the reading operation, and in step S4, a frame is skipped in the writing operation.

Next, with reference to FIGS. 2 and 3B, it is assumed that the reading of a frame of image data is executed, as shown in step S21. Simultaneously, the writing of image data is performed (see step S1). When the reading of the frame is completed (see step S22), the comparator A53 compares the writing line number L3 received from the image writing section A3 with the threshold L4 received from the writing line number threshold register A51 (see step S23). The writing line number L3 indicates the number of lines in the current frame which have already been written. If L3>L4, the operation is returned to step S21 and the reading operation is continued, while if L3≦L4, it is determined that the reading operation may go ahead of the writing operation, and in step S24, the current frame is again read in the reading operation.

In the present embodiment, a picture corresponds to a frame. However, a picture may correspond to a field.

As explained above, according to the above embodiment, each line of image data is written into the image memory A7 by using a clock signal in synchronism with an input image signal, and simultaneously, data is written in Macro Block units by using a stabilized clock signal. Here, the writing and reading operation is controlled while the number of written lines is compared with a predetermined threshold, and the number of read Macro Blocks is compared with a predetermined threshold. Therefore, the writing operation does not go ahead of the reading operation, and the reading operation does also not go ahead of the writing operation, and it is possible to prevent the current frame from being erroneously switched to another frame while the current frame is being processed.

In the conventional technique, a plurality of image memory interfaces, image writing section, and the like are necessary. However, in the present embodiment, a common image memory A7 is used, so that such duplication of circuit elements is unnecessary, and it is possible to realize an image coding apparatus having the function of a time base corrector, which has a simple structure and whose processing time is short.

Figure 4:
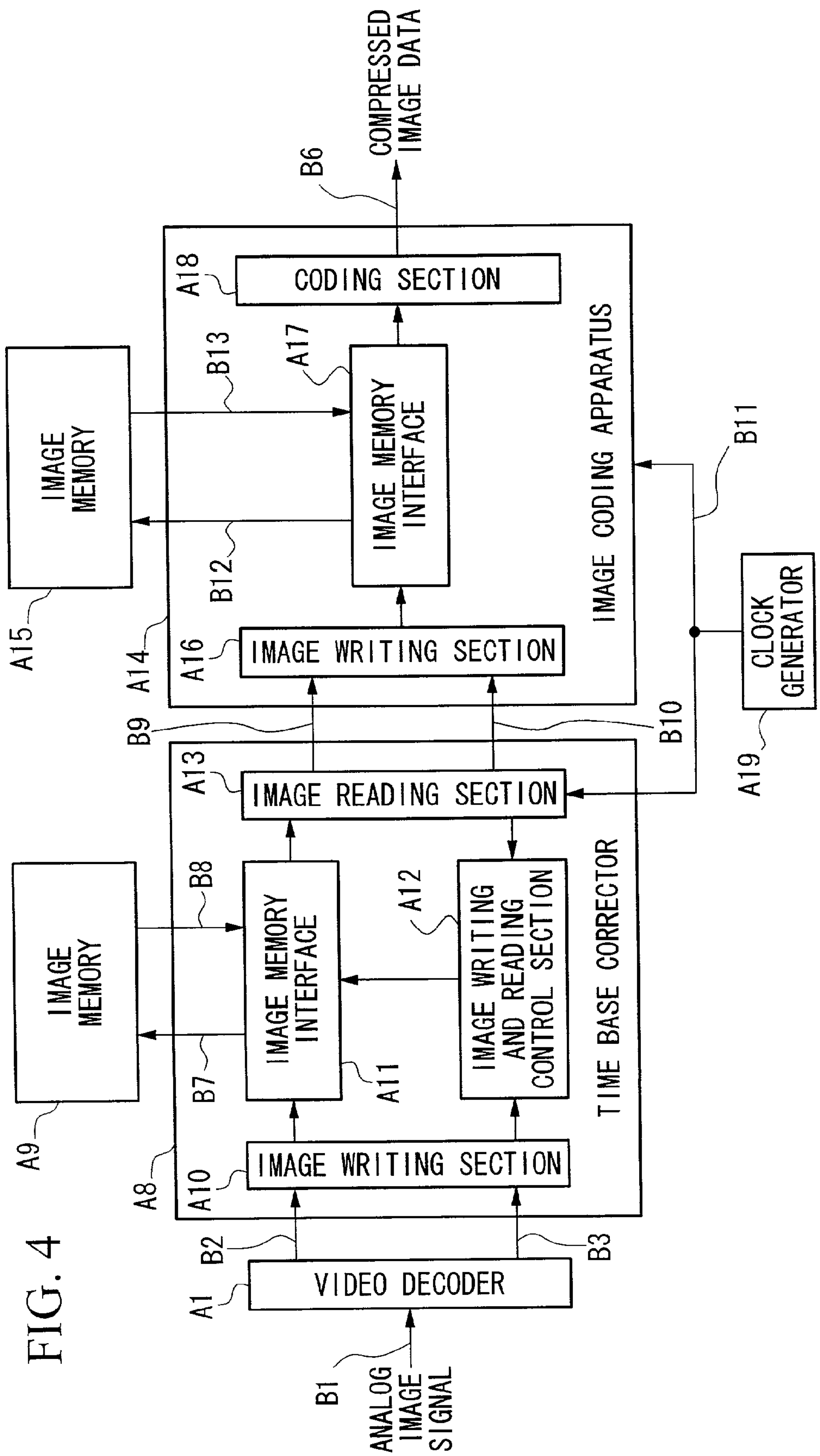
FIG. 4 is a block diagram showing the structure of a conventional time base corrector and image coding apparatus.
Figure 5:
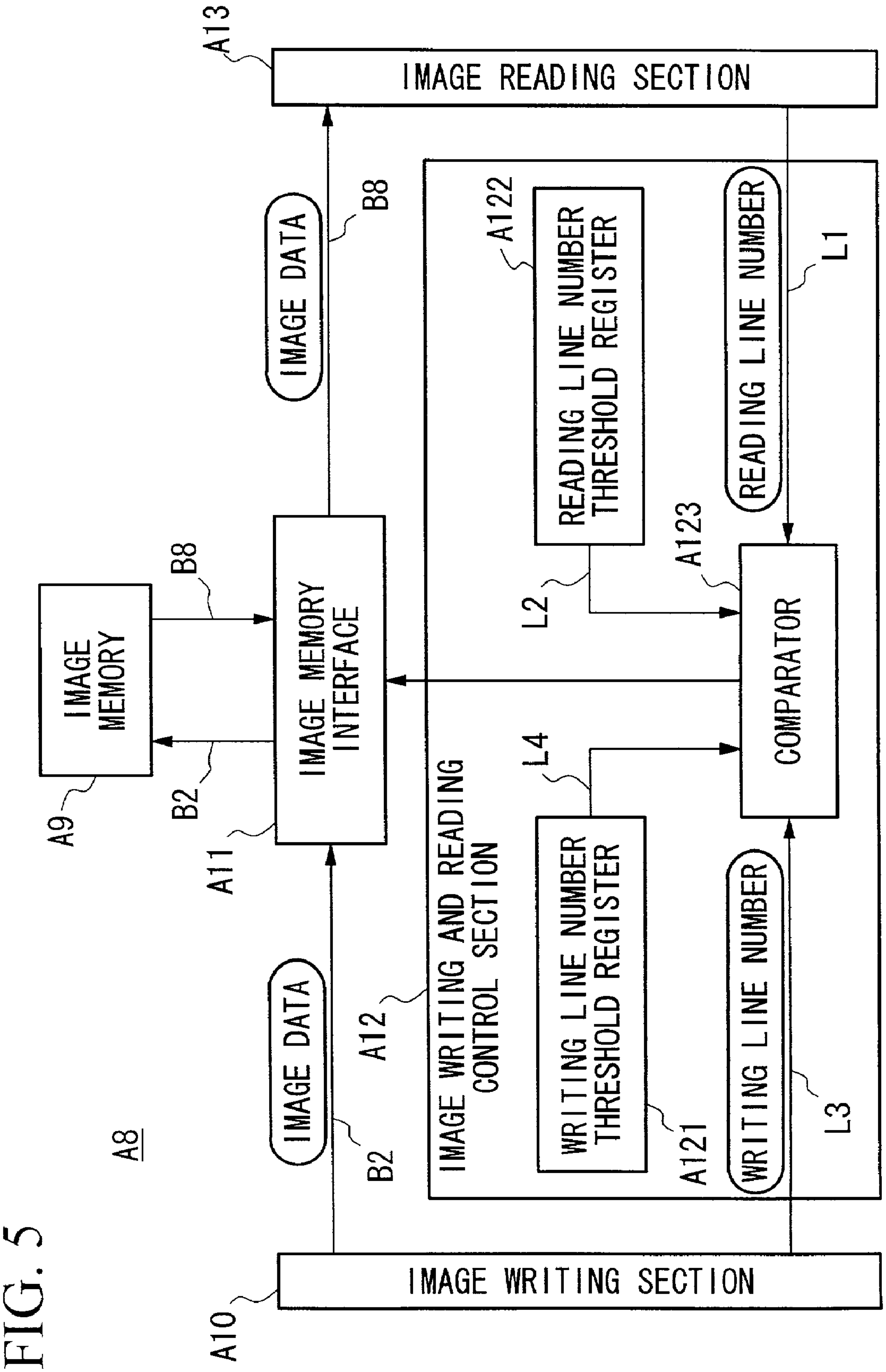
FIG. 5 is a block diagram showing the detailed structure of the image writing and reading control section in the time base corrector of FIG. 4.
Figure 6A:
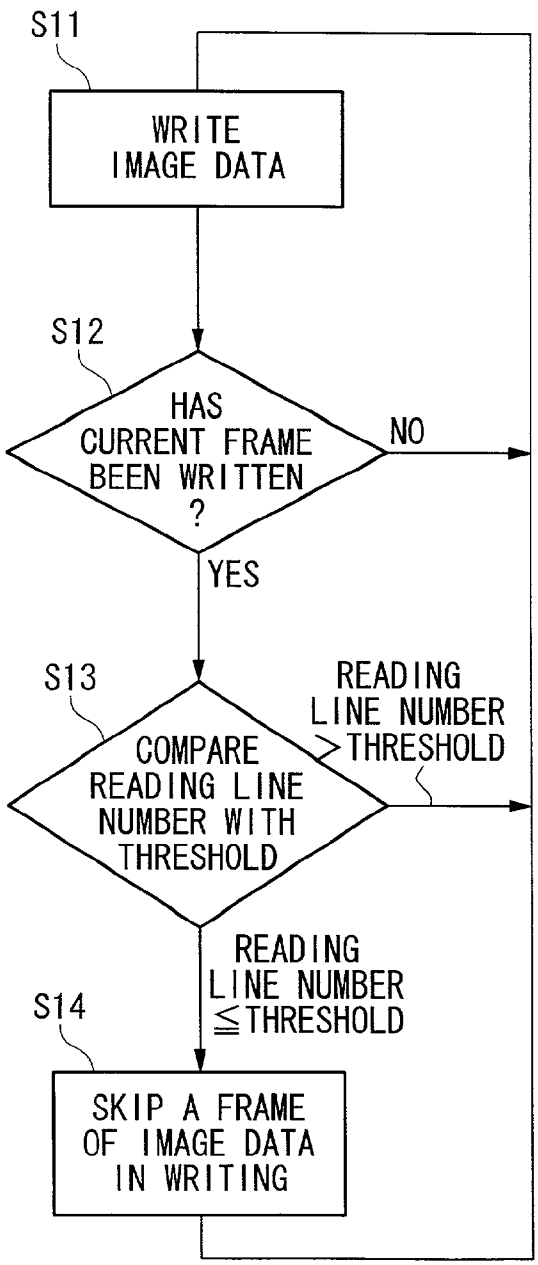
FIG. 6A is a flowchart of the operation of writing data into the image memory in the conventional time base corrector.
Figure 6B:
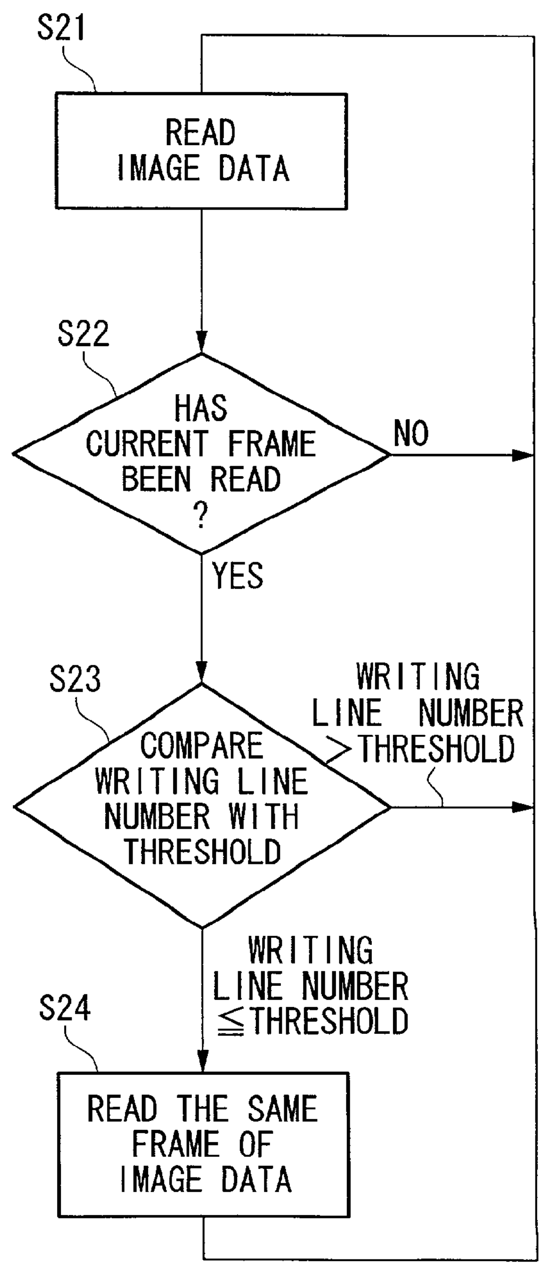
FIG. 6B is a flowchart of the operation of reading data from the image memory.

More specifically, it is assumed that in the conventional apparatus as shown in FIG. 4, a memory capacity of 2 frames (or 2 fields, a corresponding variation will also be applied below) is assigned to each of the image memory A9 and image memory A15, that is, a capacity of 4 frames is provided. In this case, in the present embodiment, image memory A7 needs a memory capacity of 3 frames, and accordingly, only a single image memory interface A4, a single image writing section A3, and the like are necessary.

If an image processing apparatus (as shown in FIG. 1) is realized in a computer system having a CPU or MPU, a memory, and the like, the memory functions as a computer readable storage medium according to the present invention. In this storage medium, program codes for executing an operation, which includes the operation shown in FIGS. 3A and 3B, are stored. In addition, various types of storage media such as a disk type medium, a semiconductor memory, and the like, may be used as the above storage medium.

What is claimed is:

1. An image processing apparatus comprising:

an image memory for storing image data; and a control section for performing control of writing each line of input image data to the image memory in turn while reading image data from the image memory in predetermined coding units, in a manner such that:

when a picture of the image data has been written, if the number of data units, each corresponding to the coding unit, is equal to or below a first threshold, then a picture is skipped in the image data writing operation; and when a picture of the image data has been read, if the number of written lines is equal to or below a second threshold, then the same picture is again read in the image data reading operation.

2. An image processing apparatus as claimed in claim 1, wherein:

the image data writing operation is performed using a clock signal in synchronism with the input image data; and the image data reading operation is performed using a stabilized clock signal different from the clock signal used in the image data writing operation.

3. An image processing apparatus as claimed in claim 1, further comprising:

a coding section for coding the read image data in the predetermined coding units.

4. An image processing apparatus as claimed in claim 1, wherein the predetermined coding unit is a Macro Block defined in MPEG.

5. An image processing apparatus as claimed in claim 1, wherein a picture corresponds to a frame of image data.

6. An image processing apparatus as claimed in claim 1, wherein a picture corresponds to a field of image data.

7. An image processing method comprising the step of:

performing control of writing each line of input image data to an image memory in turn while reading image data from the image memory in predetermined coding units, in a manner such that:

when a picture of the image data has been written, if the number of data units, each corresponding to the coding unit, is equal to or below a first threshold, then a picture is skipped in the image data writing operation; and when a picture of the image data has been read, if the number of written lines is equal to or below a second threshold, then the same picture is again read in the image data reading operation.

8. An image processing method as claimed in claim 7, wherein:

the image data writing operation is performed using a clock signal in synchronism with the input image data; and the image data reading operation is performed using a stabilized clock signal different from the clock signal used in the image data writing operation.

9. An image processing method as claimed in claim 7, further comprising the step of:

coding the read image data in the predetermined coding units.

10. An image processing method as claimed in claim 7, wherein the predetermined coding unit is a Macro Block defined in MPEG.

11. An image processing method as claimed in claim 7, wherein a picture corresponds to a frame of image data.

12. An image processing method as claimed in claim 7, wherein a picture corresponds to a field of image data.

13. A computer readable storage medium storing a program for making a computer execute an operation including the step of:

performing control of writing each line of input image data to an image memory in turn while reading image data from the image memory in predetermined coding units, in a manner such that:

when a picture of the image data has been written, if the number of data units, each corresponding to the coding unit, is equal to or below a first threshold, then a picture is skipped in the image data writing operation; and when a picture of the image data has been read, if the number of written lines is equal to or below a second threshold, then the same picture is again read in the image data reading operation.

14. A computer readable storage medium as claimed in claim 13, wherein in the program:

the image data writing operation is performed using a clock signal in synchronism with the input image data; and the image data reading operation is performed using a stabilized clock signal different from the clock signal used in the image data writing operation.

15. A computer readable storage medium as claimed in claim 13, wherein the program further comprises the step of:

coding the read image data in the predetermined coding units.

16. A computer readable storage medium as claimed in claim 13, wherein in the program, the predetermined coding unit is a Macro Block defined in MPEG.

17. A computer readable storage medium as claimed in claim 13, wherein in the program, a picture corresponds to a frame of image data.

18. A computer readable storage medium as claimed in claim 13, wherein in the program, a picture corresponds to a field of image data.

* * * * *